April 22, 1952   P. R. SCHROEPPEL   2,593,617
WINDROWER
Filed June 20, 1946   3 Sheets-Sheet 1
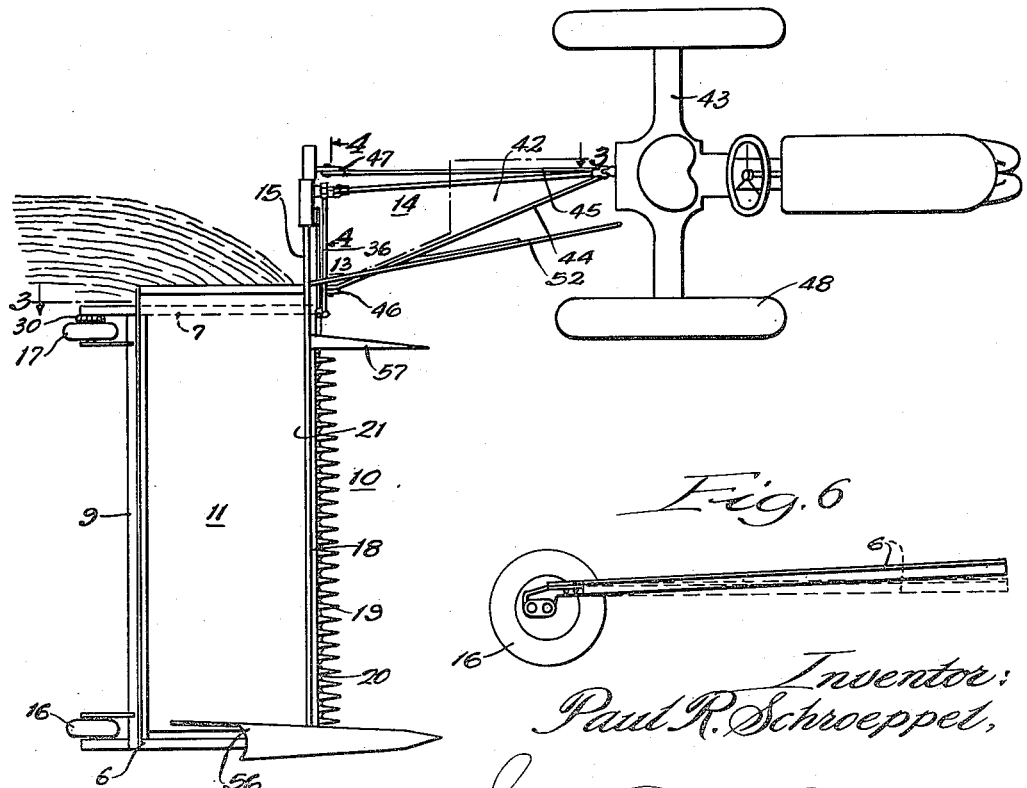

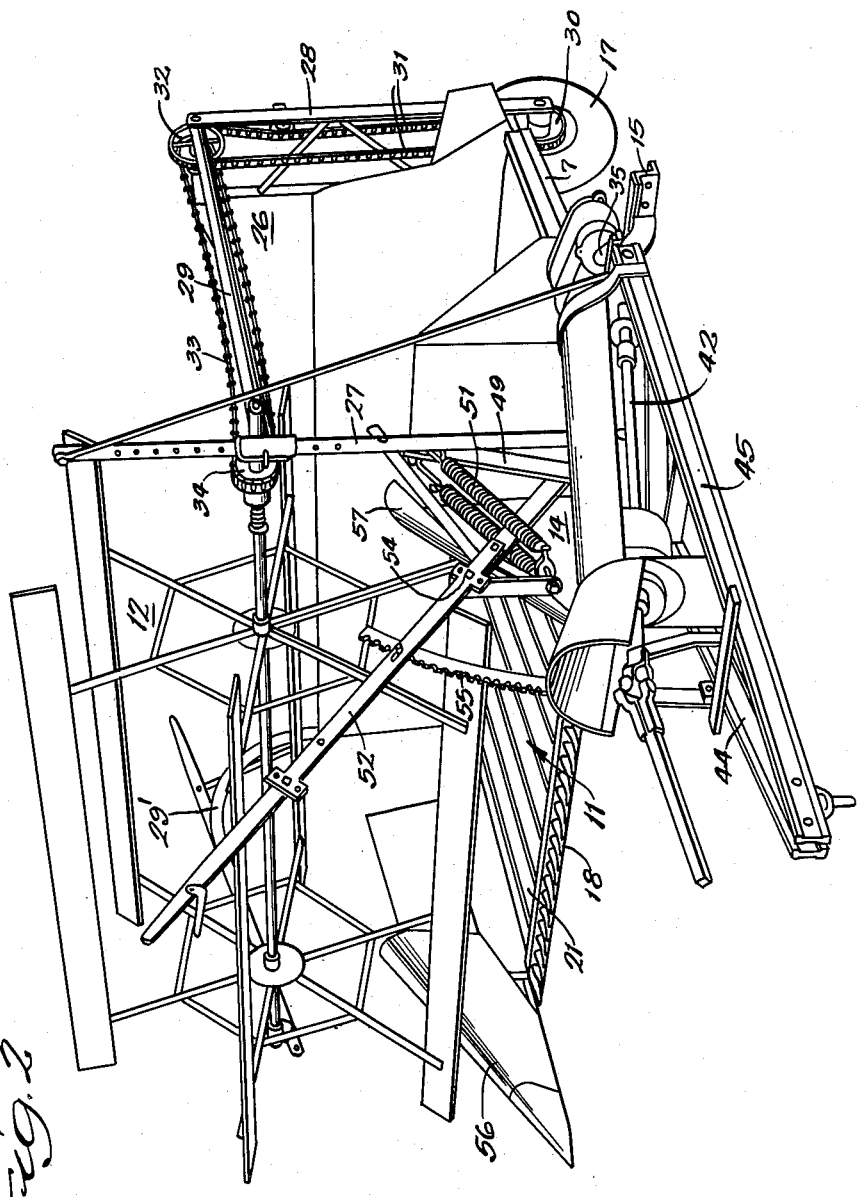

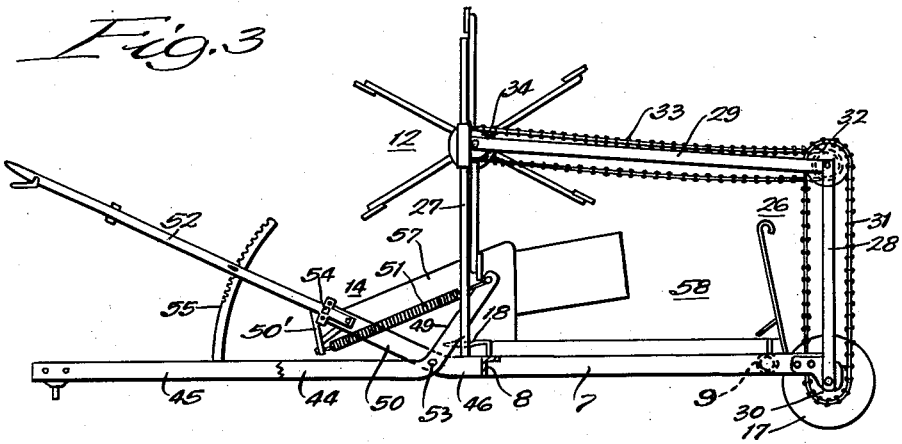
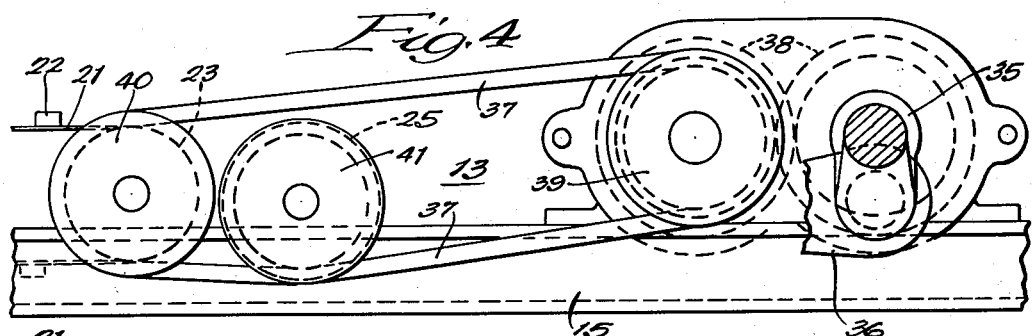
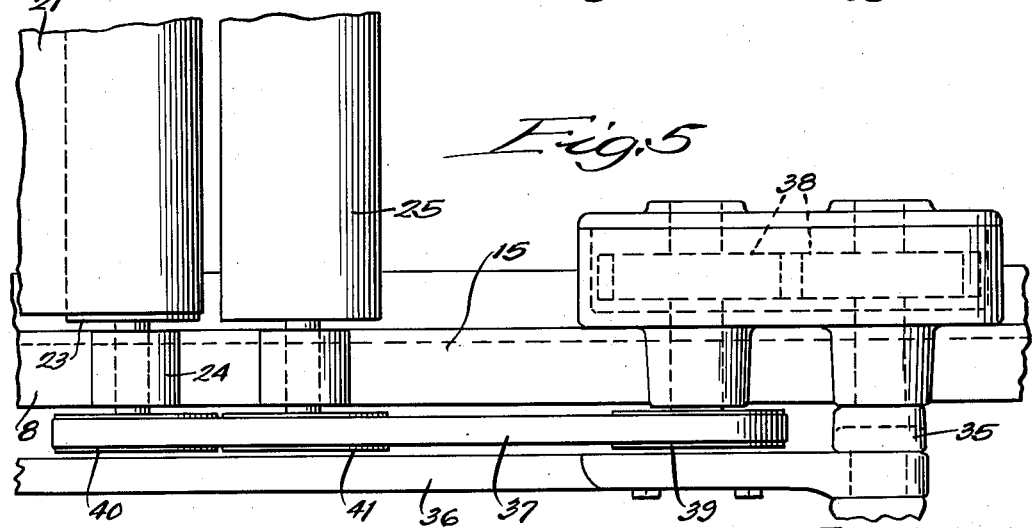

Patented Apr. 22, 1952

2,593,617

UNITED STATES PATENT OFFICE 2,593,617

WINDROWER

Paul R. Schroeppel, Rockford, Ill., assignor to J. I. Case Company, Racine, Wis., a corporation of Wisconsin Application June 20, 1946, Serial No. 677,994

2 Claims. (Cl. 56—23)

The present invention relates to harvesting machines of the type commonly known as windrowers wherewith successive swaths of grain, as they are cut, are conveyed to one end of the machine, transversely of the direction of movement of the machine, and laid in parallel windrows on the stubble from which the grain has been previously cut. Machines of this kind, whether pulled or pushed, require a construction and arrangement of their several parts so that two major results will be accomplished with the greatest possible effectiveness.

First, the machine must be capable of adjustment with respect to the horizontal so that it may be accommodated to grain of varying heights and conditions of stand. Secondly, the machine must lay the windrows on stubble that has not been crushed by the wheels of the windrower itself or the tractor and also so that it will not be traversed subsequently by the machine or the draft means, as the normal harvesting operation continues.

The main objects of this invention, therefore, are to provide an improved construction of a pull-type windrower having an improved construction of the supporting frame for mounting the cutting and conveying mechanisms and the operating means therefor; to provide an improved windrower construction which will discharge the cuttings from each swath of grain from the inner end of the frame intermediate the inner drive wheel and the steering wheels of the tractor; to provide an improved construction of the main supporting frame whereby under operative conditions the outer end of the frame is maintained in the same horizontal plane with the inner end of said frame so as to preclude the possibility of the cutting and conveyor mechanisms binding; to provide an improved construction and arrangement of the draft bar connection for a windrower of this kind; and to provide improved means associated with the draft bar connection for effecting the required adjustments of the cutting and conveyor mechanisms relative to the horizontal.

A preferred embodiment of this improved windrower is shown in the accompaying drawings in which:

Fig. 1 is a plan view of the improved harvesting machine connected to a tractor, showing its association with a windrow as it is being laid in relation to the two previously-laid windrows;

Fig. 2 is an enlarged front perspective view of a windrower constructed in accordance with this invention;

Fig. 3 is an enlarged end view of the windrower as viewed from the plane of the line 3—3 of Fig. 1;

Fig. 4 is an enlarged detail in front elevation of the driving means for the cutting and conveying mechanisms, as viewed from the plane of the line 4—4 of Fig. 1;

Fig. 5 is a plan view of the same;

Fig. 6 is a diagrammatic end elevation of the outer end of the windrower frame showing in dotted and full outline the misalined plane on which the two end bars are secured to the rear member so that during operative conditions the plane of the outer end of the frame will be substantially coincident with the plane of the inner end of the frame.

Because much of the structure and mechanisms herein shown are of a conventional nature, no attempt has been made to be exact and complete in the illustration of all details. It is assumed that form and connections, where not clearly illustrated, will be readily understood from their outline or diagrammatic appearance in the drawing taken with the following explanations.

A windrower constructed in accordance with this invention comprises a main supporting frame formed of a pair of inner and outer end bars 7 and 6 and a pair of front and rear members or bars 8 and 9 secured together so as to provide a support for a cutting mechanism 10, a conveyor mechanism 11, a reel mechanism 12, operating means 13 for the cutting and conveying mechanisms 10 and 11, and a draw bar and leveling structure 14.

The frame bars 6, 7, and 8 are generally of angle form, whereas the bar 9 is preferably a pipe. These are rigidly secured together, so as to provide the required support for the above-mentioned mechanisms and means, and are mounted on a pair of wheels so that drawn behind a tractor the machine will cut a swath directly inward from the adjacent drive wheel of the tractor which will fall clear of the previously formed paths of crushed stubble caused by the wheels of the tractor and also clear of the path of the tractor or windrower wheels during the cutting of subsequent swaths. Moreover, these frame parts are assembled so as to secure the outer forward part thereof against sagging, as will appear presently.

The end bar 6 is secured at the outer end of the front bar 8 and the rear bar or pipe 9. The inner end bar 7 is secured to the inner end of the bar or pipe 9 and to the front bar 8 at a point inwardly from an extension 15 which provides a mounting for the operating means 13 and the draw bar and leveling structure 14, as will appear more fully hereinafter.

The parts 6, 7, 8, and 9 are preferably welded together. However, the union of the bars 6 and 7 to the pipe 9 is such that prior to mounting the cutting, conveyor, and reel mechanisms 10, 11, and 12, thereon, the plane of the bar 6 extends upwardly at a slight angle to the plane of the bar 7, as illustrated diagrammatically in Fig. 6. This is done so that when the machine is completely assembled, the weight of the above-mentioned mechanisms, at the outer forward portion of the frame, will tend to lower the outer end of the bar 6 to bring it in to a plane in substantial alinement with the end bar 7. Thus, without the use of any auxiliary means, the cutting mechanism and the conveyor mechanism will be disposed in the same horizontal plane throughout their lengths without the likelihood that, during the operation of the windrower, the plane of these mechanisms will be distorted so as to cause a binding that would stall their operation or cause excessive wear of the parts, as would be the case if the forward outer portion of the frame were allowed to sag.

The end bars 6 and 7 are extended rearwardly of the rear bar or pipe 9 so as to provide supports for suitable bearings for the windrower wheels 16 and 17.

The cutting mechanism 10 is of the usual type, involving a cutter bar 18, with the usual guards 19, on which is mounted the sickle 20. This mechanism is arranged along and above the front bar 8.

The conveying mechanism 11 is of a more or less conventional construction, embodying a canvas apron or draper 21 (see Figs. 4 and 5) equipped with transverse strips 22 and extending around rollers journalled at the ends of the frame. The driving roller 23 for the draper 21 is journalled in suitable bearings 24 on the frame bars 8 and 9, directly above the inner end bar 7. Adjacent to this roller 23 is mounted an auxiliary roller 25 and which is driven in the same direction and in synchronism with roller 23. The function of this auxiliary roller 25 is to facilitate the discharge of the grain from the draper 21.

The reel mechanism 12, of the usual construction, and its associated driving mechanism 26 are supported in the usual position above the cutting and conveyor mechanisms 10 and 11 by means of arms 27, 28, and 29. These, together with the adjacent frame end bar 7, approximate the form of a trapezoid as shown in Fig. 3. The vertically-disposed arm 27 is pivoted at its lower end to the frame bar 8. The vertically-disposed arm 28 is pivotally mounted at its lower end adjacent the rear end of the end bar 7. The nearly horizontal bar 29 connects these vertically-disposed bars and permits the reel mechanism 12 to be shifted in a horizontal plane forwardly and rearwardly of a direct vertical position over the cutting mechanism 10.

For a narrow-swath machine no other support is required for the reel 12 and its driving mechanism 26. However, in a wide-swath machine an auxiliary arm 29' is arranged at the outer end of the main supporting frame (see Fig. 2).

The drive mechanism 26 for the reel 12 includes a sprocket 30 fixed to the windrower wheel 17 which by means of a chain 31 drives a sprocket 32 which in turn drives a chain 33 connected to the sprocket 34 on the reel.

The operating means 13 for the cutting and conveying mechanisms 10 and 11 as herein shown comprises a crankshaft 35 which is connected to the cutting mechanism 10 by the usual pitman 36 and to the conveyor driving roller 23 through the medium of a belt 37 connecting pulleys 39 and 40, the former of which is operatively connected to the crankshaft 35 by a pair of gears 38. The belt 37 engages the under-side of the pulley 41 connected to the auxiliary roller 25. The crankshaft 35 is connected to a drive shaft 42, supported on the draw bar and leveling structure 14 which drive shaft is connected to a suitable power shaft on the tractor 43. It will be understood, of course, that a chain and sprocket mechanism might preferably be substituted for the belt and pulley mechanism as above set forth.

The draw bar and leveling structure 14 comprises a V-shaped frame wherein the elements 44 and 45, at their base ends, are pivotally connected to the front bar 8 and its extension 15, respectively, and at their opposite or apex ends are connected together for attachment to a draft pin on the tractor 43. The pivotal connection of the base ends of the elements 44 and 45 is made to brackets 46 and 47 rigidly connected to and extending forwardly from the frame bar 8 and the extension 15 with the draw bar so arranged that the windrower will be positioned to cut a swath of grain directly inward from the inner drive wheel 48 of the tractor 43.

The leveling mechanism is formed by a pair of arms 49 and 50, oppositely-disposed extensions respectively of the element 44 and bracket 46, connected together at their outer ends by a tension spring 51 and associated with the usual control lever 52. The arms 49 and 50 extend upwardly and opposite each other on respectively opposite sides of the pivot 53 by which the element 44 is connected to the bracket 46.

The tension spring 51 is connected to the end of the arm 49 but crosses the arm 50 and is attached to a brace 50' supported on the outer end of the arm 50. Thus the spring 51 exerts a pull on the arms 49 and 50 to counterbalance the weight of the main frame, and the means supported thereon, so as to normally urge the frame toward a parallel position with the ground. This renders easier the operation of the lever 52 for altering the level of the windrower to any desired position with respect to the horizontal for the purpose of accommodating the cutting mechanism to the condition and stand of the grain.

The lever 52 is secured at 54 to the outer end of the extension arm 50. A suitable pawl (not shown) is arranged to co-act with a segment 55, of usual construction, for locking the lever in any of its shifted positions, thereby securing the cutting and conveying mechanisms at a predetermined level with respect to the horizontal.

The windrower is equipped with the usual dividers 56 and 57 and an outer end guard 58.

The operation of the windrower will be apparent, it is believed, from the foregoing description.

Variations and modifications in the details of structure and arrangement of the parts may be resorted to within the spirit and coverage of the appended claims.

I claim:

1. A windrower of the class described comprising a generally rectangular supporting frame including a front bar, a pair of spaced-apart side bars, and a tubular rear member, said bars and tubular rear member being rigidly interconnected, a pair of spaced-apart support wheels attached at opposite ends of said tubular member, said front frame bar having a portion extending sidewardly beyond one of said side members, a forwardly extending drawbar hingedly attached to said sidewardly extending portion of said front frame bar, said supporting frame being supported by said drawbar and wheels, a cutter bar mounted on said front frame bar forwardly thereof, and a side delivery conveyor mounted on said frame rearwardly of said cutter bar thereby to receive grain cut by said cutter bar and discharge it sidewardly over one side member and behind said drawbar, said tubular rear member being prestressed in torsion to bear the portion of the weight of said frame, cutter bar, conveyor, and grain which is borne by the other of said side members, and means for adjusting the height of said cutter bar from the ground comprising a forwardly and upwardly extending arm which is rigidly attached to said sidewardly extending portion of said front frame bar, a rearwardly and upwardly extending arm rigidly attached to said drawbar adjacent its point of hinged connection to said sidewardly extending member, said rearwardly and upwardly extending arm being disposed in crossed relation with said forwardly and upwardly extending arm, a tension spring, said tension spring being attached at one of its ends to said forwardly and upwardly extending arm and at its other end to said rearwardly and upwardly extending arm to counterbalance the weight of said supporting frame, cutter bar, conveyor, and grain, an adjusting lever connected to said forwardly and upwardly extending arm, and means on said drawbar for determining the position of said adjusting lever relative to said drawbar.

2. In a windrower of the class described comprising, a generally rectangular supporting frame, a cutter bar and side delivery crop conveyor mounted on said supporting frame, a pair of support wheels journalled on opposite ends of said frame, a forwardly extending drawbar, a hinged connection for attaching said drawbar to the forward portion of said frame for vertical swinging movement relative thereto, and means for adjusting the height of said cutter bar with respect to the ground including a forwardly and upwardly extending arm which is rigidly attached to said supporting frame, a rearwardly and upwardly extending arm which is rigidly attached to said drawbar adjacent said hinged connection, said rearwardly and upwardly extending arm being disposed in crossed relation with said forwardly and upwardly extending arm, a tension spring, said tension spring being attached at one of its ends to said forwardly and upwardly extending arm and at its other end to said rearwardly and upwardly extending arm to counterbalance the weight of said supporting frame, said cutter bar, and said side delivery conveyor, an adjusting lever connected to said forwardly and upwardly extending arm, and means on said drawbar for determining the position of said adjusting lever relative to said drawbar.

PAUL R. SCHROEPPEL.

REFERENCES CITED

The following references are of record in the file of this patent:

UNITED STATES PATENTS

| Number | Name | Date |
|---|---|---|
| 2,071,844 | Korsmo et al. | Feb. 23, 1937 |
| 2,135,621 | Millard | Nov. 8, 1938 |
| 2,281,059 | Anderson et al. | Apr. 28, 1942 |
| 2,354,962 | Oehler et al. | Aug. 1, 1944 |
| 2,423,303 | Fienhold | July 1, 1947 |